US 12,422,815 B2

United States Patent
Uenishi et al.

(10) Patent No.: US 12,422,815 B2
(45) Date of Patent: Sep. 23, 2025

(54) NUMERICAL VALUE CONTROLLER

(71) Applicant: FANUC CORPORATION, Yamanashi (JP)

(72) Inventors: Daisuke Uenishi, Yamanashi (JP); Tomohiro Oyamada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 399 days.

(21) Appl. No.: 18/007,180

(22) PCT Filed: Aug. 25, 2021

(86) PCT No.: PCT/JP2021/031074
§ 371 (c)(1),
(2) Date: Jan. 27, 2023

(87) PCT Pub. No.: WO2022/045162
PCT Pub. Date: Mar. 3, 2022

(65) Prior Publication Data
US 2023/0236566 A1    Jul. 27, 2023

(30) Foreign Application Priority Data
Aug. 31, 2020 (JP) .................... 2020-145552

(51) Int. Cl.
*G05B 19/402* (2006.01)
*G05B 19/416* (2006.01)

(52) U.S. Cl.
CPC ......... *G05B 19/402* (2013.01); *G05B 19/416* (2013.01); *G05B 2219/36292* (2013.01)

(58) Field of Classification Search
CPC ... B23B 2270/32; B23B 49/00; G05B 19/402; G05B 19/40937; G05B 19/416; G05B 2219/36292; G05B 2219/41109
See application file for complete search history.

(56) References Cited

U.S. PATENT DOCUMENTS

| 4,606,001 A * | 8/1986 | Rieben | G05B 19/408 700/183 |
| 2003/0170085 A1* | 9/2003 | Kakino | G05B 19/40937 409/132 |

(Continued)

FOREIGN PATENT DOCUMENTS

| CN | 104227496 A | 12/2014 |
| CN | 107203186 A | 9/2017 |

(Continued)

*Primary Examiner* — Kidest Bahta
(74) *Attorney, Agent, or Firm* — Maier & Maier, PLLC

(57) ABSTRACT

A numerical value controller for a machine tool includes a storage unit storing a machining program for drilling a hole in a workpiece in accordance with relative movement between a tool and workpiece in a depth direction, and a control unit controlling the relative movement between the tool and workpiece based on the machining program and that moves the tool relative to the workpiece in the depth direction from a return point to a hole bottom point. The return point is a position retracted in the depth direction from a workpiece surface where the tool starts to perform drilling. The machining program includes a command for a workpiece height point as a position of the workpiece surface. The control unit moves the tool relative to the workpiece in the depth direction at a relative rate higher than a cutting feed rate from the return point to the height point.

4 Claims, 3 Drawing Sheets

(56) References Cited

U.S. PATENT DOCUMENTS

2014/0379115 A1* 12/2014 Koyanaka .......... G05B 19/4166
                                                    700/159
2017/0269576 A1* 9/2017 Oonishi ............... G05B 19/416

FOREIGN PATENT DOCUMENTS

| JP | S62246408 A | 10/1987 |
| JP | S6427838 A | 1/1989 |
| JP | H09120310 A | 5/1997 |
| JP | 2000343308 A | 12/2000 |
| JP | 2003001509 A | 1/2003 |
| JP | 2015-187799 * | 10/2015 |
| JP | 2015187799 A | 10/2015 |
| JP | 2016078223 A | 5/2016 |
| JP | 2017004300 A | 1/2017 |
| WO | 2009001681 A1 | 12/2008 |
| WO | 2018042704 A | 3/2018 |

* cited by examiner

NUMERICAL VALUE CONTROLLER

TECHNICAL FIELD

The present invention relates to numerical value controllers.

BACKGROUND

A machining method used in the related art involves repeating a canned cycle in a drilling process of a workpiece (for example, see Japanese Unexamined Patent Application, Publication No. Hei 09-120310 and Japanese Unexamined Patent Application, Publication No. 2017-004300). In Japanese Unexamined Patent Application, Publication No. Hei 09-120310 and Japanese Unexamined Patent Application, Publication No. 2017-004300, a high-speed drilling process is achieved by optimizing the path and the rate of movement of a tool relative to the workpiece and shortening the non-cutting time period.

SUMMARY

An aspect of the present disclosure provides a numerical value controller for a machine tool. The numerical value controller includes a storage unit that stores a machining program for drilling a hole in a workpiece in accordance with relative movement between a tool and the workpiece in a depth direction extending along a longitudinal axis of the tool, and a control unit that controls the relative movement between the tool and the workpiece based on the machining program and that moves the tool relative to the workpiece in the depth direction from a return point to a hole bottom point. The return point is a position retracted in the depth direction from a workpiece surface where the tool starts to perform a drilling process. The machining program includes a command for a workpiece height point serving as a position of the workpiece surface in the depth direction. The control unit moves the tool relative to the workpiece in the depth direction at a relative rate higher than a cutting feed rate from the return point to the workpiece height point.

DETAILED DESCRIPTION OF THE EMBODIMENTS

A numerical value controller according to an embodiment will be described below with reference to the drawings.

Figure 1:
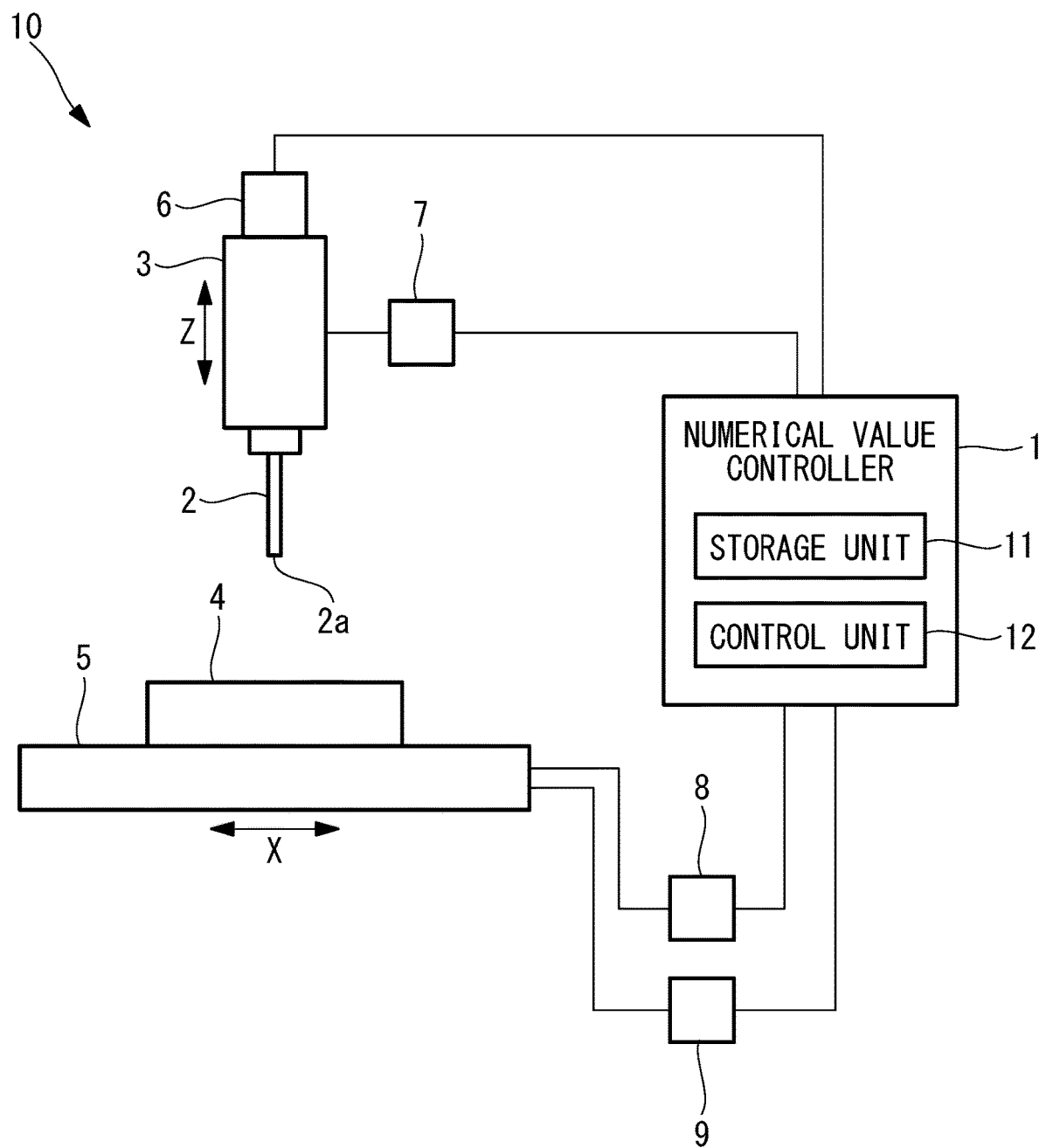
FIG. 1 illustrates the configuration of a machine tool according to an embodiment.

As shown in FIG. 1, a numerical value controller 1 is for a machine tool 10 that machines a workpiece 4 by using a tool 2.

The machine tool 10 includes a spindle 3 that holds the tool 2, a table 5 that holds the workpiece 4, a spindle motor 6 that rotates the spindle 3, a Z-axis feed motor 7 that moves the spindle 3 in a Z direction relative to the table 5, an X-axis feed motor 8 and a Y-axis feed motor 9 that move the table 5 in an X direction and a Y direction, respectively, relative to the spindle 3, and the numerical value controller 1 that controls the motors 6, 7, 8, and 9.

The Z direction extends along the longitudinal axis of the tool 2 held by the spindle 3. The X direction and the Y direction are orthogonal to the longitudinal axis of the tool 2 held by the spindle 3 and are orthogonal to each other. In the machine tool 10 in FIG. 1, the Z direction extends vertically, whereas the X direction and the Y direction extend horizontally.

The spindle 3 is disposed in the vertical direction and is supported by a support mechanism (not shown) in such a manner as to be vertically movable. The tool 2 is held coaxially with the spindle 3 by a lower end of the spindle 3 and rotates and moves together with the spindle 3. The tool 2 is a drill that forms a hole 4a in the workpiece 4 in the depth direction (Z direction) thereof. The tool 2 may alternatively be another type of tool for machining the workpiece 4 in the depth direction, and may be, for example, a milling cutter or an end mill.

The table 5 is disposed horizontally below the spindle 3. The workpiece 4 placed on the upper surface of the table 5 is fixed to the table 5 by using a jig (not shown).

The spindle motor 6 is connected to the upper end of the spindle 3 and rotates the spindle 3 around the longitudinal axis of the spindle 3.

The feed motors 7, 8, and 9 are servomotors.

The numerical value controller 1 includes a storage unit 11 and a control unit 12.

The storage unit 11 has, for example, a RAM, a ROM, and another storage device, and stores a machining program 11a (see FIG. 2) for drilling a hole in the workpiece 4 in accordance with relative movement between the tool 2 and the workpiece 4.

The control unit 12 has a processor, such as a central processing unit. The control unit 12 controls the feed motors 7, 8, and 9 based on the machining program 11a so as to control the relative movement between the spindle 3 and the table 5, thereby controlling the relative movement between the tool 2 and the workpiece 4.

Figure 2:
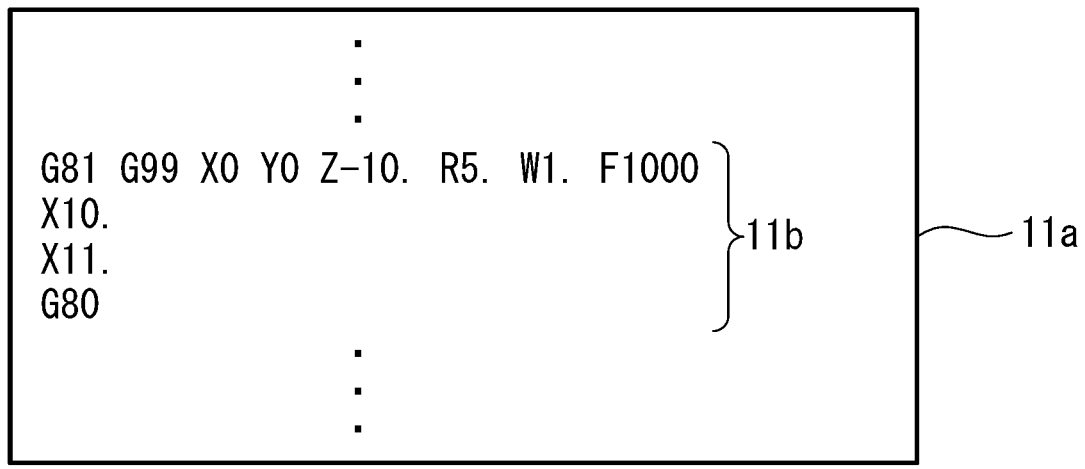
FIG. 2 illustrates an example of a drilling canned cycle program.
Figure 3:
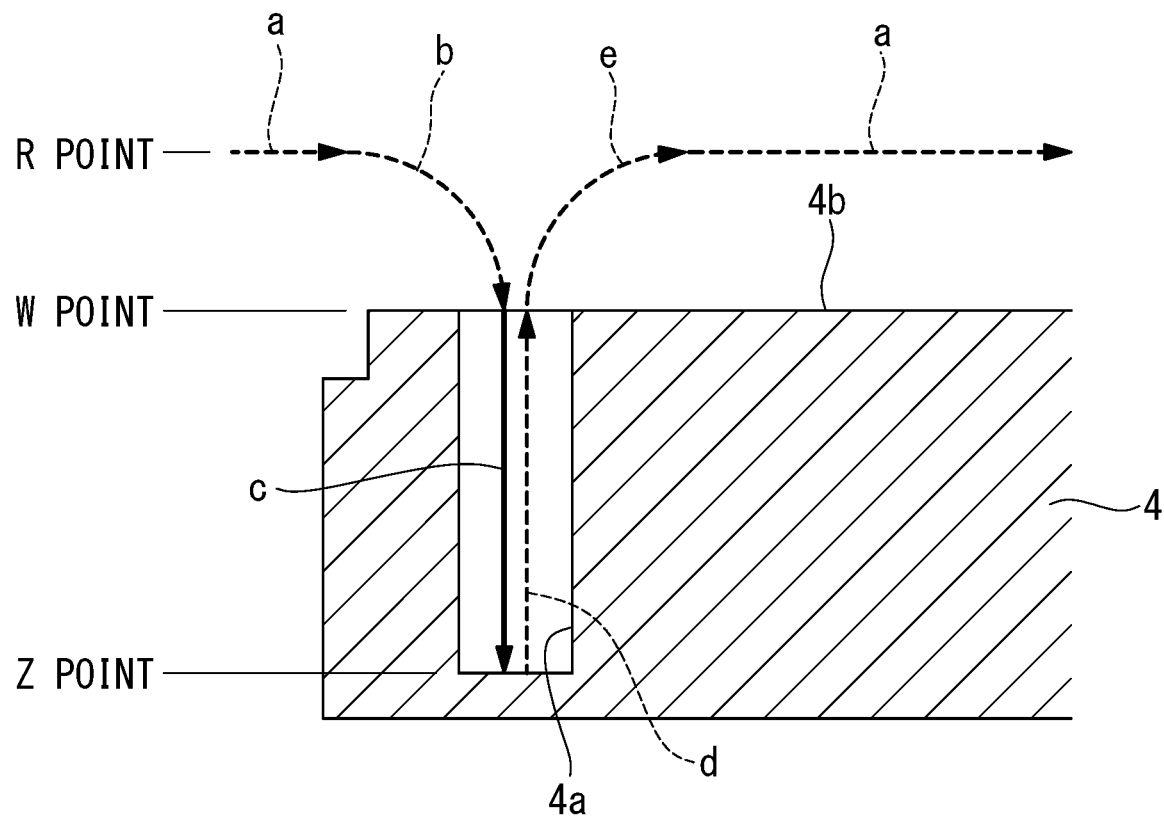
FIG. 3 illustrates an example of a drilling process according to a drilling canned cycle.

As shown in FIG. 2, the machining program 11a includes a drilling canned cycle program 11b. As shown in FIG. 3, the canned cycle program 11b causes the machine tool 10 to execute a canned cycle, including a positioning operation, a drilling operation, and a removing operation, multiple times. In FIG. 3, dashed and solid arrows each indicate a path along which the tool 2 moves relative to the workpiece 4. In FIG. 3, the horizontal direction is the XY direction, and the vertical direction is the Z direction.

The machining program 11a includes commands for designating a W point (workpiece height point), an R point (return point), and a Z point (hole bottom point). The W point is the position of a workpiece surface 4b in the Z direction. The workpiece surface 4b is the surface of the workpiece 4 from where the tool 2 starts to perform a drilling (cutting) process on the workpiece 4, and is the upper surface of the workpiece 4 in this embodiment. The R point is the position, in the Z direction, retracted in the Z direction from the workpiece surface 4b, and is located away from the workpiece surface 4b by, for example, 1 mm to 5 mm. The Z point is the position of the bottom of the hole 4a in the Z direction and is located opposite from the R point relative to the workpiece surface 4b.

The positioning operation involves moving the workpiece 4 in the XY direction relative to the tool 2 by moving the table 5 in the XY direction, so as to position a drilling position of the workpiece 4 in the XY direction relative to the tool 2. Paths a and b are the paths of the tool 2 in the positioning operation.

The drilling operation involves moving a tip 2a of the tool 2 in the Z direction from the R point to the Z point by lowering the spindle 3, so as to drill a hole in the drilling position of the workpiece 4. Paths b and c are the paths of the tool 2 in the drilling operation.

The removing operation involves moving the tip 2a of the tool 2 in the Z direction from the Z point to the R point by raising the spindle 3, so as to remove the tool 2 from the hole 4a. Paths d and e are the paths of the tool 2 in the positioning operation.

FIG. 2 illustrates an example of the canned cycle program 11b that involves repeating the canned cycle three times.

"G81" is a command code for executing the drilling canned cycle, "G99" is a command code for returning to the R point, and "G80" is a command code for canceling the canned cycle. "X0 Y0" is a positioning command for positioning the drilling position in the X direction and the Y direction, "Z-10." is a command for the Z point, "R5." is a command for the R point, "W1." is a command for the W point, and "F1000" is a command for the cutting feed rate. Specifically, the R point is set to Z=5 mm, the Z point is set to Z=-10 mm, and the W point is set to Z=1 mm. In the second and third rows, the commands Y, Z, R, W, and F whose command values are identical to those in the first row are omitted.

The control unit 12 controls the movement of the spindle 3 and the tool 2 in the Z direction by controlling the feed motor 7, and controls the movement of the table 5 and the workpiece 4 in the XY direction by controlling the feed motors 8 and 9.

The control unit 12 controls the feed motors 7, 8, and 9 while rotating the spindle 3 and the tool 2 by using the spindle motor 6, thereby causing the machine tool 10 to execute the positioning operation, the drilling operation, and the removing operation.

The control unit 12 starts the drilling operation before the positioning operation ends, so as to cause the movement of the workpiece 4 in the XY direction in the positioning operation and the movement of the tool 2 in the Z direction in the drilling operation to temporally overlap each other. Consequently, the tip 2a of the tool 2 moves along a first curved path b from the R point to the W point.

Furthermore, the control unit 12 starts the positioning operation in a subsequent canned cycle before the removing operation ends, so as to cause the ascending of the tool 2 in the Z direction in the removing operation and the movement of the workpiece 4 in the XY direction in the positioning operation to temporally overlap each other. Consequently, the tip 2a of the tool 2 moves along a second curved path e from the W point to the R point.

The control unit 12 moves the workpiece 4 at a rapid traverse rate in the positioning operation, and moves the tool 2 at the rapid traverse rate in the removing operation. Moreover, in the drilling operation, the control unit 12 moves the tool 2 at the rapid traverse rate from the R point to the W point and subsequently moves the tool 2 at the cutting feed rate from the W point to the Z point.

The rapid traverse rate is the maximum rate of each of the feed motors 7, 8, and 9. The cutting feed rate is lower than the rapid traverse rate and is a rate suitable for the tool 2 to drill a hole in the workpiece 4.

In FIG. 3, the paths a, b, d, and e along which the tool 2 moves at the rapid traverse rate relative to the workpiece 4 are indicated with dashed lines, and the path c along which the tool 2 moves at the cutting feed rate relative to the workpiece 4 is indicated with a solid line. Although the position of the linear path d is misaligned from the position of the linear path c in the XY direction in FIG. 3, the two linear paths c and d are actually aligned with each other.

Next, a method of how the numerical value controller 1 controls the machine tool 10 will be described.

When the canned cycle program 11b commences, the control unit 12 causes the machine tool 10 to execute a first canned cycle. Specifically, the control unit 12 causes the table 5 to start executing the positioning operation by controlling the feed motors 8 and 9, and positions a first drilling position of the workpiece 4 relative to the tool 2.

Subsequently, the control unit 12 causes the spindle 3 to start executing the drilling operation by controlling the feed motor 7, and causes the tool 2 to drill a hole in the first drilling position. In this case, the control unit 12 starts the drilling operation before the positioning operation ends, thereby moving the tip 2a of the tool 2 along the curved path b. In the drilling operation, the control unit 12 moves the tool 2 at the rapid traverse rate from the R point to the W point, and moves the tool 2 at the cutting feed rate from the W point to the Z point.

Upon completion of the drilling operation, the control unit 12 causes the spindle 3 to start executing the removing operation by controlling the feed motor 7, so as to remove the tool 2 from the hole 4a.

Then, the control unit 12 causes the machine tool 10 to execute a second canned cycle. Specifically, the control unit 12 causes the table 5 to start executing the positioning operation, and positions a second drilling position of the workpiece 4 relative to the tool 2. In this case, the control unit 12 starts the positioning operation in the second canned cycle before the removing operation in the first canned cycle ends, thereby moving the tip 2a of the tool 2 along the curved path e.

The control unit 12 executes the drilling operation and the removing operation in the second canned cycle similarly to those in the first canned cycle, and further executes a third canned cycle.

Accordingly, in this embodiment, during the period in which the tip 2a of the tool 2 moves in the Z direction from the R point toward the W point, the movement of the tool 2 in the Z direction and the movement of the workpiece 4 in the XY direction are temporally overlapped with each other, and the tool 2 moves along the curved path b. During the period in which the tip 2a of the tool 2 moves in the Z direction from the W point toward the R point, the movement of the tool 2 in the Z direction and the movement of the workpiece 4 in the XY direction are temporally overlapped with each other, and the tool 2 moves along the curved path e. Consequently, a non-cutting time period in which the tool 2 is not cutting the workpiece 4 is shortened, as compared with a case where the drilling operation is started after the positioning operation is entirely completed and the subsequent positioning operation is started after the removing operation is entirely completed.

Furthermore, the canned cycle program lib is different from a drilling canned cycle program in the related art in that the canned cycle program lib includes the command for the W point. A numerical value controller in the related art that controls the movement of the tool 2 in accordance with the canned cycle program in the related art moves the tip 2a of the tool 2 at the cutting feed rate from the R point to the Z point. In this embodiment, the command for the W point is added so that the rate from the R point to the W point can be controlled to a rate other than the cutting feed rate, so that the tool 2 can be moved at the rapid traverse rate from the R point to the W point. Accordingly, the non-cutting time period can be further shortened.

As an alternative to this embodiment in which the tool 2 is moved at the rapid traverse rate from the R point to the W point, the moving rate of the tool 2 in the Z direction from the R point to the W point may be any rate that is higher than the cutting feed rate and lower than the rapid traverse rate. Moreover, the moving rate of the tool 2 from the R point to the W point may be changeable between the cutting feed rate and the rapid traverse rate.

Figure 4:
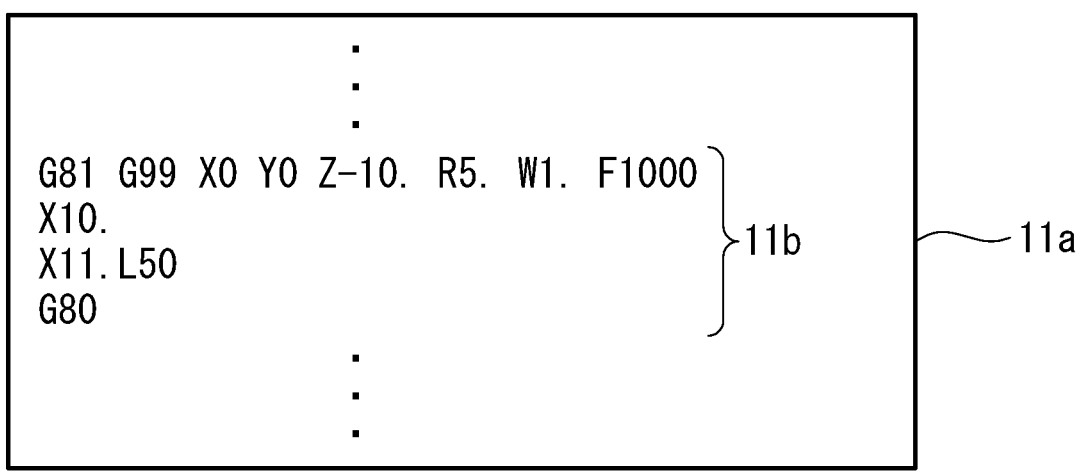
FIG. 4 illustrates another example of the drilling canned cycle program.

For example, as shown in FIG. 4, an argument L that designates a speed ratio between a cutting feed rate $F_C$ and a rapid traverse rate $F_R$ may be added to the canned cycle program 11b. L denotes a value ranging between 0% and 100%. A moving rate F of the tool 2 is defined by the following expression.

$$F=F_C\times(1-(L/100))+F_R\times L/100$$

By setting the value of L, the operator can designate the rate F to any rate between the cutting feed rate and the rapid traverse rate.

As an alternative to this embodiment in which the tool 2 is moved at the rapid traverse rate from the R point to the W point, the moving rate of the tool 2 in the Z direction from the R point to the W point may be changed in a stepwise fashion from the rapid traverse rate to the cutting feed rate depending on the position of the tip 2a of the tool 2.

For example, assuming that the position of the tip 2a is defined as $Z_n$, the moving rate F of the tool 2 in the Z direction is defined by the following expression from the cutting feed rate $F_C$ and the rapid traverse rate $F_R$.

$$F=(F_C\times|R-Z_n|+F_R\times|Z_n-W|)/|R-W|$$

With the position of the tip 2a changing in this manner, the rate F can be changed in a stepwise fashion from the rapid traverse rate to the cutting feed rate.

As an alternative to this embodiment in which the tool 2 is moved at the rapid traverse rate from the R point to the W point, the moving rate of the tool 2 in the Z direction from the R point to the W point may be changed from the rapid traverse rate to the cutting feed rate at any position between the R point and the W point.

For example, the rate may be changed from the rapid traverse rate to the cutting feed rate at an intermediate position between the R point and the W point in accordance with the responsiveness of mechanical control. Accordingly, if the tip 2a is not accurately positioned when reaching the W point in a machine tool with low responsiveness of mechanical control, the moving rate in the Z direction may be changed from the rapid traverse rate to the cutting feed rate at a position higher than the W point, so that the timing at which the tip 2a reaches the W point can be changed, thereby shortening the non-cutting time period and enabling accurate positioning.

As an alternative to this embodiment in which the control unit 12 controls the feed motors 7, 8, and 9 such that the tool 2 moves along the curved paths b and e between the R point and the W point, the feed motors 7, 8, and 9 may be controlled such that the tool 2 moves along the linear paths alone. Specifically, the control unit 12 may start the drilling operation after the positioning operation ends, and may start the positioning operation in a subsequent canned cycle after the removing operation ends.

With such control, the moving rate of the tool 2 in the Z direction from the R point to the W point is set to a rate higher than the cutting feed rate, so that the non-cutting time period can be shortened.

As an alternative to this embodiment in which the W point is included in the canned cycle program 11b, the W point may be defined by using a parameter in the form of a data table stored in a memory. Moreover, the W point may be a predetermined fixed value.

For example, the storage unit 11 of the numerical value controller 1 may preliminarily store the W point as 1.0 mm, and the W point may be invoked when a command for the canned cycle program 11b is given.

Furthermore, the W point may be a fixed value set to a position closer toward the workpiece 4 than the R point by −4.0 mm when a command for the canned cycle program 11b is given. In the drilling process, the R point is often set to a position located 0.5 mm to 1.0 mm away from the upper surface of the workpiece 4 for shortening the non-cutting time period. Therefore, by setting the W point to a position −4.0 mm closer toward the workpiece 4 than the R point, the non-cutting time period can be shortened without the command for the W point.

As an alternative to this embodiment in which each hole 4a is formed by non-step drilling, each hole 4a may be formed by step drilling. Step drilling involves reciprocating the tool 2 multiple times in the Z direction to divide the distance from the W point to the Z point into multiple segments, and cutting a predetermined amount from each segment.

In the step drilling in the related art, the tool 2 returns to the R point every time the tool 2 cuts the workpiece 4. In this embodiment, the tool 2 may be returned to the W point or to any height between the R point and the W point, instead of the R point, and the tool 2 may subsequently start descending from the W point or from any height between the R point and the W point. Accordingly, the time required for machining each hole 4a can be shortened.

Although a drilling process in a canned cycle is described in this embodiment, the present disclosure may be applied to a drilling process that does not use a canned cycle. Specifically, the command for the W point may be added to a machining program for an arbitrary drilling process, and the tool and the workpiece may be moved relative to each other in the depth direction from the R point to the W point at a rate higher than the cutting feed rate in the drilling operation of the arbitrary drilling process.

As an alternative to this embodiment in which the tool 2 is movable in the Z direction and the workpiece 4 is movable in the XY direction, the relative movement between the tool 2 and the workpiece 4 may be achieved in accordance with the movement of either one of or both of the tool 2 and the workpiece 4. For example, the spindle 3 may be movable in the XY direction, and the table 5 may be movable in the Z direction. As another alternative, one of the spindle 3 and the table 5 may be movable in three directions, namely, the X, Y, and Z directions.

Furthermore, as an alternative to this embodiment in which the tool 2 moves vertically and the workpiece 4 moves horizontally, the directions of movement of the tool 2 and the workpiece 4 may be changeable, as appropriate, in accordance with the specifications of the machine tool. For example, in a case where the machine tool has the spindle 3 disposed in the horizontal direction, the tool 2 may move horizontally and the workpiece 4 may move vertically.

The invention claimed is:

1. A numerical value controller for a machine tool, the numerical value controller comprising:
a memory that stores a machining program for drilling a hole in a workpiece in accordance with relative movement between a tool and the workpiece in a depth direction extending along a longitudinal axis of the tool; and
a processor configured to control the relative movement between the tool and the workpiece based on the machining program and move the tool relative to the workpiece in the depth direction from a return point to a hole bottom point,
wherein the return point is a position retracted in the depth direction from a workpiece surface where the tool starts to perform a drilling process,
wherein the machining program includes a command for a workpiece height point serving as a position of the workpiece surface in the depth direction,
wherein the processor is configured to:
move, from the return point to an intermediate position between the return point and the workpiece height point, the tool relative to the workpiece in the depth direction at a rapid traverse rate higher than a cutting feed rate; and
change, at the intermediate position, a relative rate of the tool relative to the work piece in the depth direction from the rapid traverse rate to the cutting feed rate, and
wherein the intermediate position is determined according to a responsiveness of mechanical control of the machine tool.

2. The numerical value controller according to claim 1, wherein the workpiece height point is a numerical value stored in the numerical value controller.

3. The numerical value controller according to claim 1,
wherein the machining program causes the machine tool to execute a plurality of canned cycles each including a positioning operation, a drilling operation, and a removing operation,
wherein the positioning operation involves positioning a drilling position of the workpiece relative to the tool by moving the tool and the workpiece relative to each other in a direction intersecting the depth direction,
wherein the drilling operation involves drilling a hole in the drilling position by moving the tool in the depth direction from the return point to the hole bottom point,
wherein the removing operation involves removing the tool from the hole by moving the tool in the depth direction from the hole bottom point to the return point, and
wherein the processor is configured to:
start the drilling operation before the positioning operation ends, to relatively move the tool along a first curved path from the return point to the workpiece height point; and
start the positioning operation in a subsequent canned cycle before the removing operation ends, to relatively move the tool along a second curved path from the workpiece height point to the return point.

4. The numerical value controller according to claim 1, wherein, in step drilling involving reciprocating the tool a plurality of times in the depth direction to drill a hole by a predetermined amount every time until the hole reaches the hole bottom point, the processor is configured to retract the tool to the workpiece height point or to a height between the return point and the workpiece height point.

* * * * *